United States Patent
Li et al.

(10) Patent No.: US 10,892,809 B2
(45) Date of Patent: Jan. 12, 2021

(54) METHOD AND APPARATUS FOR TRANSMITTING CSI FEEDBACK INFORMATION FOR MULTIPLE BEAMS

(71) Applicant: NTT DOCOMO, INC., Tokyo (JP)

(72) Inventors: Huiling Li, Beijing (CN); Chongning Na, Beijing (CN); Yuichi Kakishima, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/609,598

(22) PCT Filed: Mar. 2, 2018

(86) PCT No.: PCT/CN2018/077843
§ 371 (c)(1),
(2) Date: Oct. 30, 2019

(87) PCT Pub. No.: WO2018/201786
PCT Pub. Date: Nov. 8, 2018

(65) Prior Publication Data
US 2020/0153495 A1 May 14, 2020

(30) Foreign Application Priority Data
May 4, 2017 (CN) .......................... 2017 1 0308369

(51) Int. Cl.
*H04B 7/06* (2006.01)
*H04B 7/0417* (2017.01)

(52) U.S. Cl.
CPC ......... *H04B 7/0626* (2013.01); *H04B 7/0417* (2013.01)

(58) Field of Classification Search
CPC ... H04B 7/0626; H04B 7/0417; H04B 7/0695
See application file for complete search history.

(56) References Cited

U.S. PATENT DOCUMENTS

2015/0358064 A1* 12/2015 Benjebbour ........... H04B 7/065
                                                      370/329
2016/0191201 A1*  6/2016 Park ..................... H04B 7/0639
                                                      370/252

(Continued)

*Primary Examiner* — Jean B Corrielus
(74) *Attorney, Agent, or Firm* — Osha Bergman Watanabe & Burton LLP

(57) ABSTRACT

Provided are a method and apparatus for transmitting CSI feedback information for multiple beams. The method includes: transmitting information for indicating a type of the CSI feedback information; transmitting a first type of CSI feedback information in the CSI feedback information for the multiple beams by using a first type of CSI feedback manner, wherein the first type of CSI feedback information includes at least first transmission rank information, first channel quality information and feedback information for a first beam in the multiple beams; and transmitting a second type of CSI feedback information in the CSI feedback information for the multiple beams by using a second type of CSI feedback manner, wherein the second type of CSI feedback information includes at least second transmission rank information, second channel quality information, and feedback information for beams other than the first beam in the multiple beams.

20 Claims, 4 Drawing Sheets

(56) References Cited

U.S. PATENT DOCUMENTS

| | | | |
|---|---|---|---|
| 2019/0053213 A1* | 2/2019 | Stirling-Gallacher | ........................ H04B 7/0486 |
| 2019/0123798 A1* | 4/2019 | Lou | ........................ H04B 7/061 |
| 2019/0253211 A1* | 8/2019 | Kakishima | ........... H04B 7/0619 |
| 2019/0335429 A1* | 10/2019 | Takeda | ................. H04B 7/0695 |
| 2019/0356439 A1* | 11/2019 | Lee | ........................ H04L 5/0048 |
| 2020/0007213 A1* | 1/2020 | Kakishima | ........... H04B 7/0695 |
| 2020/0036420 A1* | 1/2020 | Kishiyama | ........... H04B 7/0695 |
| 2020/0136682 A1* | 4/2020 | Faxer | ........................ H04L 1/00 |

* cited by examiner

METHOD AND APPARATUS FOR TRANSMITTING CSI FEEDBACK INFORMATION FOR MULTIPLE BEAMS

CROSS-REFERENCE TO RELATED APPLICATIONS

This application is a 371 U.S. National Stage of International Application No. PCT/CN2018/077843, filed on Mar. 2, 2018, which claims priority to Chinese Application No. 201710308369.2, filed on May 4, 2017. The entire disclosures of the above applications are incorporated herein by reference.

TECHNICAL FIELD

The present invention relates to a field of communication, and in particular to a transmission method and a transmission apparatus for CSI feedback information for multiple beams.

BACKGROUND

Full dimensional MIMO (FD-MIMO) and Massive MIMO antennas have been proposed to improve throughput of a communication system. In FD-MIMO and Massive MIMO systems, a base station can use more beams for data transmission with a user equipment as compared with traditional MIMO systems.

In order to determine a beam for transmitting data to the user equipment, the base station may statically, semi-statically or dynamically transmit channel state reference signals (CSI-RSs) for a plurality of candidate beams to the user equipment, such that the user equipment may perform channel measurement on the respective beams. Then, the base station may select, from the plurality of candidate beams, a beam for subsequent transmission to the user equipment according to feedback of the user equipment to the CSI-RSs (hereinafter referred to as CSI feedback). However, signaling overhead required for the user equipment to perform CSI feedback is increased as the number of antennas is increased.

SUMMARY

It is desirable to provide a CSI feedback manner for multiple beams to reduce signaling overhead required when the user equipment performs CSI feedback each time.

According to an aspect of the present invention, there is provided a transmission method for CSI feedback information for multiple beams, the method comprising: transmitting information for indicating a type of the CSI feedback information; transmitting a first type of CSI feedback information in the CSI feedback information for the multiple beams by using a first type of CSI feedback manner, wherein the first type of CSI feedback information includes at least first transmission rank information, first channel quality information and feedback information for a first beam in the multiple beams; transmitting a second type of CSI feedback information in the CSI feedback information for the multiple beams by using a second type of CSI feedback manner, wherein the second type of CSI feedback information includes at least second transmission rank information, second channel quality information and feedback information for beams other than the first beam in the multiple beams.

According to another aspect of the present invention, there is provided a transmission apparatus for CSI feedback information for multiple beams, the apparatus comprising: a transmitting unit configured to transmit information for indicating a type of the CSI feedback information; the transmitting unit further configured to transmit a first type of CSI feedback information in the CSI feedback information for the multiple beams by using a first type of CSI feedback manner, wherein the first type of CSI feedback information includes at least first transmission rank information, first channel quality information and feedback information for a first beam in the multiple beams; the transmitting unit further configured to transmit a second type of CSI feedback information in the CSI feedback information for the multiple beams by using a second type of CSI feedback manner, wherein the second type of CSI feedback information includes at least second transmission rank information, second channel quality information and feedback information for beams other than the first beam in the multiple beams.

In the transmission method and transmission apparatus for the CSI feedback information for the multiple beams according to embodiments of the present invention, the CSI feedback information for the multiple beams is transmitted by different types of CSI feedback manners (for example, the first type of CSI feedback manner and the second type of CSI feedback manner), and the corresponding CSI feedback information in the CSI feedback information for the multiple beams is transmitted for different types of CSI feedback manners, thereby allocating radio resources reasonably and saving overhead effectively while ensuring complete transmission of the CSI feedback information for the multiple beams.

BRIEF DESCRIPTION OF THE DRAWINGS

In order to illustrate technical solution of the embodiments of the present invention more clearly, accompanying drawings to be used in the description of the embodiments will be briefly introduced below. It is obvious that the accompanying drawings described below are merely some embodiments of the present invention, and those skilled in the art may obtain other accompanying drawings based on these accompanying drawings without creative effort.

DETAILED DESCRIPTION

Figure 1:
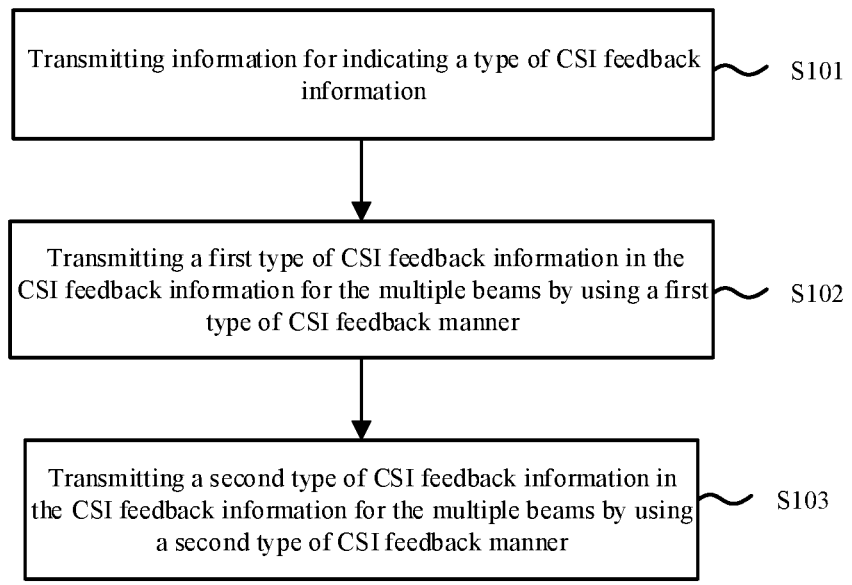
FIG. 1 shows a flow chart of a transmission method for CSI feedback information for multiple beams according to one embodiment of the present invention.

A method and a base station for transmitting channel state information reference signals according to embodiments of the present invention will be described below with reference to the accompanying drawings. Like reference numerals refer to like elements throughout the accompanying drawings. It should be understood that the embodiments described herein are merely illustrative and should not be construed as limiting the scope of the present invention. In addition, the UE described herein may include various types of user terminals, for example, a mobile terminal (or referred to as a mobile station) or a fixed terminal. However, for convenience, the UE and the mobile station sometimes may be used interchangeably hereinafter. In addition, the base station may be a fixed station, a NodeB, an eNodeB (eNB), an access point, a transmitting point, a receiving point, a femto cell, a small cell, and the like, which is not limited herein.

In the embodiments of the present invention, the UE obtains CSI feedback information for the multiple beams by measuring downlink reference signals (for example, cell-specific reference signals or CSI-RSs) transmitted by the base station, and reports the CSI feedback information for the multiple beams to the base station, thereby enabling the base station to take into account channel quality of each beam when performing downlink scheduling.

A transmission method for CSI feedback information for multiple beams according to the embodiments of the present invention will be described below with reference to FIG. 1. FIG. 1 shows a flow diagram of a transmission method 100 for CSI feedback information for multiple beams according to one embodiment of the present invention. According to examples of the invention, the method shown in FIG. 1 may be used by a User Equipment (UE).

As shown in FIG. 1, in step S101, information for indicating a type of CSI feedback information is transmitted.

In the embodiments according to the present invention, the type of the CSI feedback information may include two types, for example, a first type of CSI feedback information and a second type of CSI feedback information, where the first type of CSI feedback information may be CSI feedback information for one beam, and the second type of CSI feedback information may be CSI feedback information for a plurality of beams or CSI feedback information for all beams in the multiple beams. In addition, the first type of CSI feedback information may include CSI feedback information of a first beam in the multiple beams, and the second type of CSI feedback information may include CSI feedback information of beams other than the first beam in the multiple beams. Regarding the second type of CSI feedback information, alternatively, CSI feedback information of all beams in the multiple beams may be included.

According to one example of the present invention, the information for indicating the type of the CSI feedback information may be a CSI type indicator (CTI). In particular, the CTI may include one or more bits, and different values of the bits represent different types of the CSI. For example, when the value of the bit is "1", it means that the corresponding CSI feedback information is transmitted by using a first type of CSI feedback manner, and when the value of the bit is "0", it means that the corresponding CSI feedback information is transmitted by using a second type of CSI feedback manner.

According to one example of the present invention, the UE may independently transmit the information for indicating the type of the CSI feedback information. For example, step S101 is performed before step S102 and step S103, as shown in FIG. 1. Thus, before receiving the CSI feedback information for the multiple beams, the base station may acquire the type of the CSI feedback information to be received, so that corresponding processing may be accurately performed after receiving the CSI feedback information, thereby improving efficiency of processing the received CSI feedback information.

However, the present invention is not limited thereto. According to another example of the present invention, the UE may include and transmit the information for indicating the type of the CSI feedback information in the first type of CSI feedback information in the CSI feedback information for the multiple beams. In this case, steps S101 and S102 as shown in FIG. 1 may be simultaneously performed. Thus, the base station receives the information indicating the type of the CSI feedback information while receiving the first type of CSI feedback information, realizing one-time transmission of the type of the CSI feedback information and specific content of the CSI feedback information, thereby improving transmission efficiency.

Alternatively, according to another example of the present invention, the UE may also include and transmit the information for indicating the type of the CSI feedback information in the second type of CSI feedback information in the CSI feedback information for the multiple beams. In this case, steps S101 and S103 as shown in FIG. 1 may be simultaneously performed.

In step S102, the first type of CSI feedback information in the CSI feedback information for the multiple beams is transmitted by using the first type of CSI feedback manner, where the first type of CSI feedback information includes at least first transmission rank information, first channel quality information and feedback information for a first beam in the multiple beams.

In the embodiments according to the present invention, the multiple beams are L beams, and specifically may include one beam with the strongest power (leading beam) and (L−1) beams with relatively weak power (combined beams), where L≥2 and is a positive integer. The first beam in the multiple beams may be the beam with the strongest power in the multiple beams, or may be a beam with relatively weak power in the multiple beams.

In the embodiments according to the present invention, the first transmission rank information may be transmission rank information for a bandwidth occupied by the first beam in the multiple beams. In particular, the first transmission rank information may be transmission rank information for a bandwidth occupied by the beam with the strongest power in the multiple beams, or may be transmission rank information for a bandwidth occupied by a beam with relatively weak power in the multiple beams.

According to one example of the present invention, the first transmission rank information may be a transmission rank indicator (RI) for the first beam in the multiple beams, where the RI is a transmission rank recommended by the UE to be used by the base station in the downlink transmission, for example, a layer recommended to be used by the base station in the downlink transmission. The UE may report one RI within a valid bandwidth.

In the embodiments according to the present invention, the first channel quality information may be channel quality information for the first beam in the multiple beams. In particular, the first channel quality information may be channel quality information for the beam with the strongest power in the multiple beams, or may be channel quality information for a beam with relatively weak power in the multiple beams.

According to another example of the present invention, the first channel quality information may be a channel quality indicator (CQI) for the first beam in the multiple beams, where the CQI is channel quality information acquired at the UE side reported to the base station by the UE.

According to another example of the present invention, the feedback information for the first beam may include a Precoding Matrix Indicator (PMI) for the first beam, where the PMI indicates a precoding matrix recommended by the UE to be used by the base station in the downlink transmission, and the precoding matrix is selected based on a layer indicated by the RI. For example, the selection of the precoding matrix may be frequency selective, and the UE may recommend different precoding matrices for different portions of the downlink bandwidth. Therefore, the UE may report one or more PMIs at the same time.

For another example, the precoding matrix may include a first matrix (represented by $W_1$) and a second matrix (represented by $W_2$). Generally, $W_1$ may be a matrix of N*L, where N is the number of ports and is a positive integer, and L is the number of beams in the multiple beams and is a positive integer. Generally, $W_2$ may be an identity matrix. Therefore, the feedback information for the first beam may include a horizontal index of $W_1$ for the first beam, a vertical index of $W_1$ for the first beam, and matrix information of $W_2$ for the first beam. The PMI may indicate the horizontal index and the vertical index of $W_1$ and the matrix information of $W_2$.

According to another example of the present invention, the feedback information for the first beam may further include power information for the first beam. For example, the power information for the first beam may be a Relative Power Indicator (RPI). Relative power is a common logarithm of the ratio of the signal power of a measured point to the signal power of a reference point in the communication system. The RPI may be used to indicate the relative power. Alternatively, the first beam is the beam with the strongest power in the multiple beams, and therefore, the RPI of the first beam may be defaulted to a maximum value of 1 without being reported to the base station, thereby saving signaling overhead.

Content of the first type of CSI feedback information is represented herein by type I. According to examples of the present invention, the feedback information for the first beam may include (i1,1-1), (i1,2-1), (i2-1), and the first type of CSI feedback information may include (i1,1-1), (i1,2-1), (i2-1), RI-I and CQI-I, where the first beam is represented by the 1st beam, the first transmission rank information is represented by RI-I, the first channel quality information is represented by CQI-I, the first matrix $W_1$ in the precoding matrix for the first beam in the feedback information for the first beam is represented by i1-1 and the second matrix $W_2$ is represented by i2-1, where the horizontal index of $W_1$ for the first beam is represented by (i1,1-1) and the vertical index of $W_1$ for the first beam is represented by (i1,2-1).

In addition, as already mentioned above, in one example of the present invention, the UE may include and transmit the information for indicating the type of the CSI feedback information in the first type of CSI feedback information in the CSI feedback information for the multiple beams. For example, the information for indicating the type of the CSI feedback information may be transmitted together with the RI, the CQI or the PMI in the first type of CSI feedback information, respectively, or may be transmitted together with any combination of the RI, the CQI and the PMI in the first type of CSI feedback information, respectively, which is not limited herein.

Then, in step S103, the second type of CSI feedback information in the CSI feedback information for the multiple beams is transmitted by using the second type of CSI feedback manner, where the second type of CSI feedback information includes at least second transmission rank information, second channel quality information and feedback information for the beams other than the first beam in the multiple beams.

As already mentioned above, in the embodiments according to the present invention, the multiple beams may include one beam with the strongest power and (L−1) beams with relatively weak power. When the first beam in the multiple beams is the beam with the strongest power in the multiple beams, the beams other than the first beam in the multiple beams may be the (L−1) beams with relatively weak power in the multiple beams; when the first beam in the multiple beams is a beam with relatively weak power in the multiple beams, the beams other than the first beam in the multiple beams may be the beam with the strongest power and the remaining (L−2) beams with relatively weak power in the multiple beams.

In the embodiments according to the present invention, the second transmission rank information may be transmission rank information for a bandwidth occupied by the second beam in the multiple beams. For example, when the beams other than the first beam in the multiple beams are the (L−1) beams with relatively weak power in the multiple beams, the second transmission rank information may be transmission rank information for a bandwidth occupied by the (L−1) beams with relatively weak power in the multiple beams. For another example, when the beams other than the first beam in the multiple beams are the beam with the strongest power and the remaining (L−2) beams with relatively weak power in the multiple beams, the second transmission rank information may be transmission rank information for a bandwidth occupied by the beam with the strongest power and the remaining (L−2) beams with relatively weak power in the multiple beams.

According to one example of the present invention, the second transmission rank information may be the RI for the beams other than the first beams in the multiple beams, where the RI has been introduced above and will not be repeatedly described herein.

In the embodiments according to the present invention, the second channel quality information may be channel quality information for the beams other than the first beams in the multiple beams. For example, when the beams other than the first beam in the multiple beams are the (L−1) beams with relatively weak power in the multiple beams, the second channel quality information may be channel quality information for the (L−1) beams with relatively weak power in the multiple beams. For another example, when the beams other than the first beam in the multiple beams are the beam with the strongest power and the remaining (L−2) beams with relatively weak power in the multiple beams, the second channel quality information may be channel quality information for the beam with the strongest power and the remaining (L−2) beams with relatively weak power in the multiple beams.

According to another example of the present invention, the second channel quality information may be the CQI for the beams other than the first beam in the multiple beams, where the CQI has been introduced above and will not be repeatedly described herein.

According to another example of the present invention, feedback information for the beams other than the first beam in the multiple beams may be the PMI for the beams other than the first beam. For example, the feedback information for the beams other than the first beam in the multiple beams may include a horizontal index of $W_1$, a vertical index of $W_1$, and matrix information of $W_2$ for each of the beams other than the first beam in the multiple beams.

According to another example of the present invention, the feedback information for the beams other than the first beam in the multiple beams may further include power information for each of the beams other than the first beam in the multiple beams, where the power information for each of the beams other than the first beam in the multiple beams may also be the RPI. The RPI has been introduced above and will not be repeatedly described herein.

Content of the second type of CSI feedback information in this example is represented herein by type II. According to examples of the present invention, the beams other than the first beam are respectively represented by the 2nd beam, . . . , the ith beam, . . . , the Lth beam, where $2 \leq i \leq (L-1)$ and L is a positive integer. Feedback information for the ith beam may include (i1,1-i), (i1,2-i), i2-i, p-i, and the second type of CSI feedback information may include {(i1,1-2), . . . , (i1,1-2), . . . (i1,1-L)}, {(i1,2-2), . . . , (i1,2-2), . . . (i1,2-L)}, {i2-2, . . . , i2-i, . . . , i2-L}, {p-2, . . . , p-i, . . . , p-L)}, RI-II and CQI-II, where the second transmission rank information is represented by RI-II, the second channel quality information is represented by CQI-II, a first matrix $W_1$ in a precoding matrix for the ith beam in feedback information for the ith beam is represented by i1-i and a second matrix $W_2$ is represented by i2-i, where a horizontal index of $W_1$ for the ith beam is represented by (i1,1-i), a vertical index of $W_1$ for the ith beam is represented by (i1,2-i), and power information for the ith beam is represented by p-i.

According to another example of the present invention, the UE may obtain the second channel quality information according to the channel quality of the first beam and the channel quality of the beams other than the first beam. Correspondingly, in step S103, the second transmission rank information, the second channel quality information, and the feedback information for the beams other than the first beam in the second type of CSI feedback information may be transmitted as a whole.

In this example, the second channel quality information is obtained according to the channel quality of all beams in the multiple beams. That is, in this example, the second channel quality information is one piece of channel quality information.

Figure 2:
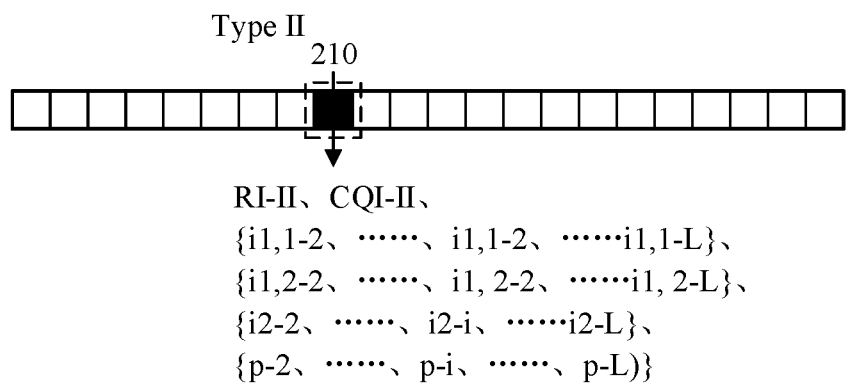
FIG. 2 shows a schematic diagram of allocation of radio resources for type II to transmit a second type of CSI feedback information in the CSI feedback information for the multiple beams by using a second type of CSI feedback manner according to one example.
Figure 3:
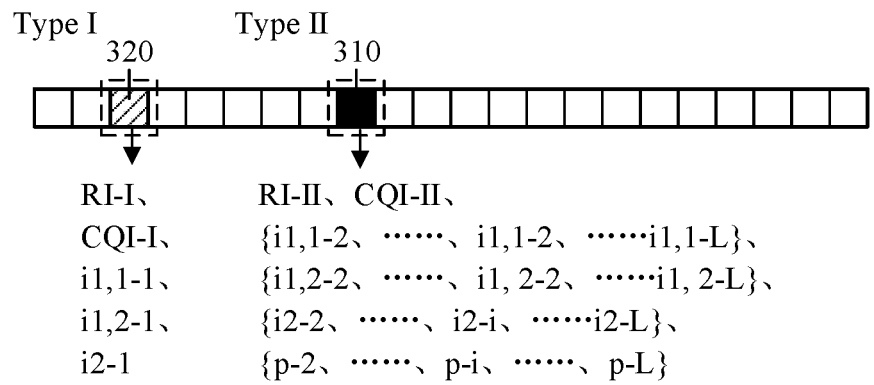
FIG. 3 shows a schematic diagram of allocation of radio resources for type I and type II shown in FIG. 2.

FIG. 2 shows a schematic diagram of allocation of radio resources 200 for the above type II to transmit the second type of CSI feedback information in the CSI feedback information for the multiple beams by using the second type of CSI feedback manner according to this example. As shown in FIG. 2, the radio resources 200 indicate resource blocks allocated by the base station to the UE, and a black block indicates a resource block 210 in the radio resources 200. The resource block 210 is used for transmission of type II. RI-II, CQI-II, the horizontal indexes of $W_1$ for the 2nd beam to the Lth beam {(i1,1-2), . . . , (i1,1-2), . . . (i1,1-L)}, the vertical indexes of $W_1$ for the 2nd beam to the Lth beam {(i1,2-2), . . . , (i1,2-2), . . . (i1,2-L)}, matrix information of $W_2$ for the 2nd beam to the Lth beam {i2-2, . . . , i2-i, . . . , i2-L}, power information for 2nd beam to the Lth beam {p-2, . . . , p-i, . . . , p-L)} of type II occupy the resource block 210 as a whole and are transmitted FIG. 2 described above shows one example of a schematic diagram of allocation of radio resources for type II to transmit the second type of CSI feedback information in the CSI feedback information for the multiple beams by using the second type of CSI feedback manner. Furthermore, according to another example of the present invention, FIG. 3 shows a schematic diagram of allocation of radio resources 300 for type I and type II shown in FIG. 2. As shown in FIG. 3, the radio resources 300 indicate resource blocks allocated by the base station to the UE. A black block indicates a resource block 310 in the radio resources 300, and the resource block 310 is used for transmission of type II. A shaded block indicates a resource block 320 in the radio resources 300, and the resource block 320 is used for transmission of type I. Type I occupies the resource block 320 and is transmitted. Type II occupies the resource block 310 as a whole and is transmitted.

Figure 4:
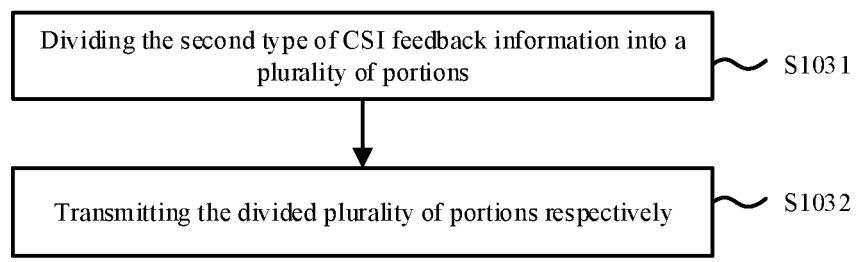
FIG. 4 shows a flow chart of a method for transmitting the second type of CSI feedback information in the CSI feedback information for the multiple beams by using the second type of CSI feedback manner according to one example of the present invention.

In addition, as already mentioned above, in step S103, the second transmission rank information, the second channel quality information, and the feedback information for the beams other than the first beam in the second type of CSI feedback information may be transmitted as a whole. Alternatively, the second type of CSI feedback information may also be divided into a plurality of portions, and the respective portions are separately transmitted to further reduce signaling overhead required when the CSI feedback is performed each time. FIG. 4 shows a flow chart of a method 400 for transmitting the second type of CSI feedback information in the CSI feedback information for the multiple beams by using the second type of CSI feedback manner according to one example of the present invention.

As shown in FIG. 4, in step S1031, the second type of CSI feedback information is divided into a plurality of portions, where each portion may include feedback information for one or more beams and channel quality information corresponding to the portion. The second transmission rank information may be included in one of the plurality of portions. Furthermore, the second channel quality information is channel quality information for the plurality of portions.

As mentioned above, it is assumed that the number of beams in the multiple beams is L, the first type of CSI feedback information includes feedback information for the first beam, and the second type of CSI feedback information includes the remaining (L−1) beams, where L≥2 and is a positive integer. In step S1031, the second type of CSI feedback information may be divided into a plurality of portions by, but not limited to, the following manner.

For example, the second type of CSI feedback information may be divided into (L−1) portions in step S1031. Channel quality information corresponding to each portion may be obtained according to channel quality of one beam in each portion. Each portion of the (L−1)-portion CSI feedback information may include feedback information for one beam, and the second channel quality information is specifically expressed as a collection of channel quality information for each portion of the (L−1) portions. That is, feedback information for the 2nd beam, . . . , feedback information for the ith beam, . . . , feedback information for the Lth beam are respectively transmitted, and in the process of respectively transmitting, the ith beam has corresponding channel quality information. Therefore, in this example, the second channel quality information is specifically expressed as a collection of the channel quality information for the 2nd beam, . . . , the channel quality information for the ith beam, . . . , and the channel quality information for the Lth beam. Furthermore, the second transmission rank information may be included in only one portion of the (L−1)-portion CSI feedback information, preferably, in a portion of the (L−1)-portion CSI feedback information that is firstly transmitted to the base station.

Figure 5:
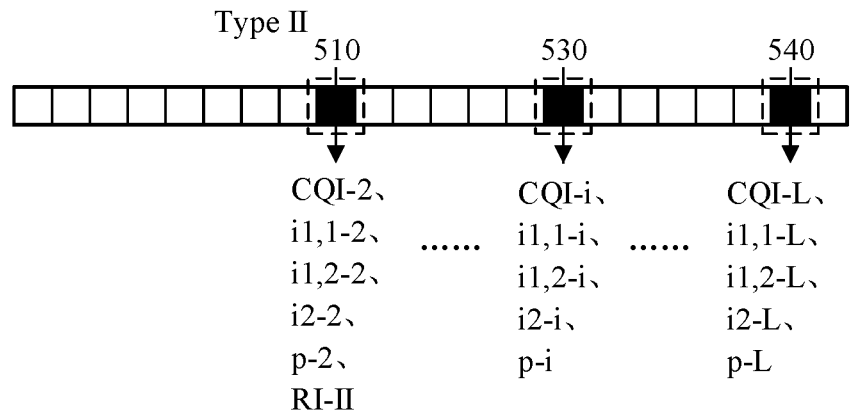
FIG. 5 shows a schematic diagram of allocation of radio resources for type II to transmit the second type of CSI feedback information in the CSI feedback information for the multiple beams by using the second type of CSI feedback manner according to another example.

FIG. 5 shows a schematic diagram of allocation of radio resources for the above type II to transmit the second type of CSI feedback information in the CSI feedback information for the multiple beams by using the second type of CSI feedback manner according to the example. As shown in FIG. 5, the radio resources 500 indicate resource blocks allocated by the base station to the UE. Black blocks indicate a resource block 510, a resource block 530 and a resource block 540 in the radio resources 500. The resource block 510, the resource block 530 and the resource block 540 are respectively used for the transmission of a portion formed by the 2nd beam, a portion formed by the ith beam and a portion formed by the Lth beam in type II. The horizontal index of $W_1$ for the ith beam, the vertical index of $W_1$, the $W_2$, the power information, and the CQI-i for the ith beam in the feedback information for the ith beam, that is, {(i1,1-i), (i1,2-i), i2-i, p-i, CQI-i}, as one portion, occupy the resource block 530 and are transmitted. Similarly, the feedback information for the 2nd beam and the CQI-2 for the 2nd beam, as one portion, occupy the resource block 510 and are transmitted, and the feedback information for the Lth beam and the CQI-L for the Lth beam, as one portion, occupy the resource block 540 and are transmitted. Also, RI-II may be included in the first portion and transmitted.

Figure 6:
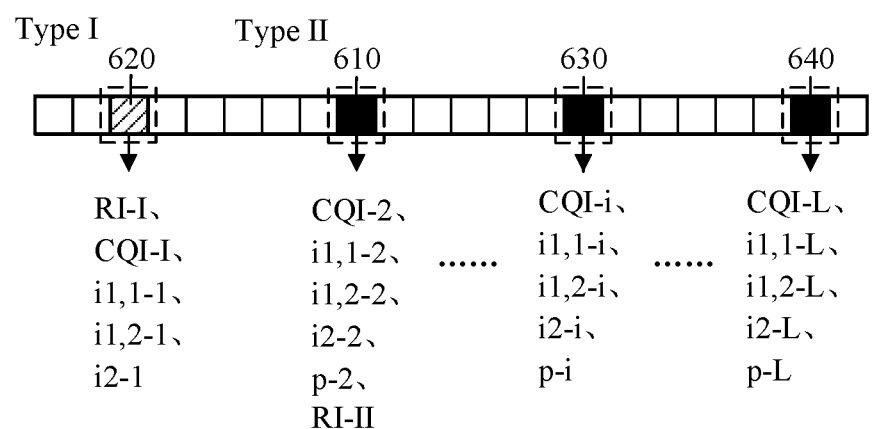
FIG. 6 shows a schematic diagram of allocation of radio resources for type I and type II shown in FIG. 5.

FIG. 5 described above shows one example of a schematic diagram of allocation of radio resources for type II to transmit the second type of CSI feedback information in the CSI feedback information for the multiple beams by using the second type of CSI feedback manner. Furthermore, according to another example of the present invention, FIG. 6 shows a schematic diagram of allocation of radio resources 600 for type I described above and type II shown in FIG. 5. As shown in FIG. 6, the radio resources 600 indicate resource blocks allocated by the base station to the UE. Black blocks indicate a resource block 610, a resource block 630 and a resource block 640 in the radio resources 600. The resource block 610, the resource block 630 and the resource block 640 are respectively used for the transmission of the portion formed by the 2nd beam, the portion formed by the ith beam and the portion formed by the Lth beam in type II. A shaded block indicates a resource block 620 in the radio resources 600, and the resource block 620 is used for the transmission of type I. Type I occupies the resource block 620 and is transmitted. The portion formed by the 2nd beam, the portion formed by the ith beam and the portion formed by the Lth beam in type II respectively occupy the resource block 610, the resource block 630 and the resource block 640 and are transmitted.

As already mentioned above, the feedback information for the beams other than the first beam in the multiple beams may also include the RPI of each beam of the beams other than the first beam in the multiple beams. When the CQI corresponding to each portion is obtained according to channel quality of one beam in each portion, the RPI of each beam has been considered in the process of calculating the CQI for each portion, that is, the RPI of each beam is implicitly embodied in the CQI for each beam. Therefore, in this case, the RPI of each beam may no longer be calculated and transmitted.

As already mentioned above, the second type of CSI feedback information is divided into (L−1) portions in step S1031, and channel quality information corresponding to each portion may be obtained according to channel quality of one beam in each portion. However, the present invention is not limited thereto. Alternatively, the second type of CSI feedback information is divided into (L−1) portions in step S1031, and the channel quality information corresponding to each portion may also be obtained according to the channel quality of the first beam and channel quality of one beam in each portion. In this case, the RPI of each beam may be calculated and transmitted. In particular, when calculating the CQI corresponding to each portion, not only the channel quality of one beam in each portion but also the channel quality of the first beam may be considered. The channel quality of the first beam is additionally considered in the process of calculating the CQI for each portion, thus, the CQI for each portion may not accurately embody the RPI of each beam. Therefore, in this case, the RPI of each beam may be calculated and transmitted.

Furthermore, as already mentioned above, the second type of CSI feedback information is divided into (L−1) portions in step S1031, and each portion may include feedback information for one beam. However, the present invention is not limited thereto. Alternatively, the second type of CSI feedback information may also be divided into a plurality of portions in step S1031, and each portion may include feedback information for at least one beam. For example, the second type of CSI feedback information may be divided into P portions, where 1≤P<(L−1) and P is a positive integer. Each portion of the P portions includes feedback information for at least one beam, and channel quality information corresponding to each portion may be obtained according to channel quality of the at least one beam in each portion. In this case, the RPI of each beam may no longer be calculated and transmitted. In particular, when the CQI corresponding to each portion is obtained according to the channel quality of the at least one beam in each portion, the RPI of each beam has been considered in the process of calculating the CQI for each portion, that is, the RPI of each beam is implicitly embodied in the CQI for each portion. Therefore, in this case, the RPI of each beam may no longer be calculated and transmitted.

However, the present invention is not limited thereto. Alternatively, the second type of CSI feedback information is divided into P portions in step S1031, and channel quality information corresponding to each portion may also be obtained according to the channel quality of the first beam and channel quality of at least one beam in each portion. In this case, the RPI of each beam may be calculated and transmitted. In particular, when calculating the CQI corresponding to each portion, not only the channel quality of the at least one beam in each portion but also the channel quality of the first beam is considered. The channel quality of the first beam is additionally considered in the process of calculating the CQI for each portion, thus, the CQI for each portion may not accurately embody the RPI of each beam in each portion. In this case, the RPI of each beam in each portion needs to be calculated and transmitted.

Then, the divided plurality of portions are respectively transmitted in step S1302.

With the method shown in FIG. 4, bit error rate is reduced by dividing the second type of CSI feedback information into a plurality of portions to transmit.

Furthermore, according to another example of the present invention, the UE may transmit the first type of CSI feedback information and/or the second type of CSI feedback information described above on a Physical Uplink Shared Channel (PUSCH) and a Physical Uplink Control Channel (PUCCH), respectively. For example, the UE may transmit both of the first type of CSI feedback information and the second type of CSI feedback information on the PUSCH; or transmit the first type of CSI feedback information on the PUSCH and transmit the second type of CSI feedback information on the PUCCH; or transmit the first type of CSI feedback information on the PUCCH and transmit the second type of CSI feedback information on the PUSCH; or transmit the first type of CSI feedback information and the second type of CSI feedback information on the PUCCH. Preferably, the UE may transmit the first type of CSI feedback information on the PUCCH or the PUSCH, and transmit the second type of CSI feedback information on the PUSCH. With this optional implementation, the second type of CSI feedback information with a relatively large amount of data is transmitted on the PUSCH, thereby occupying less radio resources for the PUCCH and saving overhead for the PUCCH.

In addition, as already mentioned above, in another optional implementation of this embodiment, the UE may include and transmit the information for indicating the type of the CSI feedback information in the second type of CSI feedback information in the CSI feedback information for the multiple beams. For example, the information for indicating the type of the CSI feedback information may be transmitted together with the RI, the PMI or the CQI in the second type of CSI feedback information, respectively, or may be transmitted together with any combination of the RI, the PMI and the CQI in the second type of CSI feedback information, respectively, which is not limited herein.

According to another example of the present invention, the method shown in FIG. 1 further comprises transmitting information indicating the number of beams in the second type of CSI feedback information. According to one example of the present invention, the information for indicating the number of beams in the second type of CSI feedback information may be a Beam Number Indicator (BNI). For example, the BNI may be included in the first type of CSI feedback information and transmitted, for example, may be transmitted together with the RI, the PMI or the CQI in the first type of CSI feedback information, respectively, or may be transmitted together with any combination of the RI, the PMI and the CQI in the first type of CSI feedback information, respectively. For another example, the BNI may also be included in the second type of CSI feedback information and transmitted, for example, may be transmitted together with the RI, the PMI or the CQI in the second type of CSI feedback information, respectively, or may be transmitted together with any combination of the RI, the PMI and the CQI in the second type of CSI feedback information, respectively. Preferably, the BNI may be transmitted together with the RI in the second type of CSI feedback information.

In the case of dividing the second type of CSI feedback information into a plurality of portions, the information for indicating the number of beams (for example, BNI) in the second type of CSI feedback information may be included in the second type of CSI feedback information and transmitted. In this example, the information for indicating the number of beams in the second type of CSI feedback information is included in only one portion of the plurality of portions and transmitted. Preferably, the information for indicating the number of beams in the second type of CSI feedback information is included in a first portion of the plurality of portions and transmitted, so that after receiving the first portion, the base station dynamically adjusts radio resources occupied by the remaining portions according to the information, thereby saving overhead.

In the transmission method for the CSI feedback information for the multiple beams according to the embodiments of the present invention, the CSI feedback information for the multiple beams is transmitted by different types of CSI feedback manners (for example, the first type of CSI feedback manner and the second type of CSI feedback manner), and the corresponding CSI feedback information in the CSI feedback information for the multiple beams is transmitted for different types of CSI feedback manners, thereby allocating radio resources reasonably and saving overhead effectively while ensuring complete transmission of the CSI feedback information for the multiple beams.

Furthermore, according to another example of the present invention, the second type of CSI feedback information may include partial of the first type of CSI feedback information. Therefore, even if the first type of CSI feedback manner is not used for the transmission of the first type of feedback information, the complete transmission of the CSI feedback information for the multiple beams may also be ensured only by the transmission of the second type of CSI feedback information.

Figure 7:
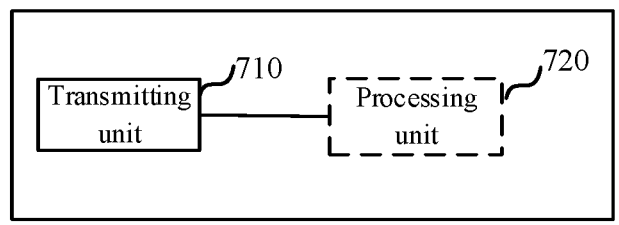
FIG. 7 shows a schematic structural diagram of a transmission apparatus for CSI feedback information for multiple beams according to one embodiment of the present invention.

A transmission apparatus for CSI feedback information for multiple beams according to the embodiments of the present invention will be described below with reference to FIG. 7. FIG. 7 shows a schematic structural diagram of the transmission apparatus for the CSI feedback information for the multiple beams according to the embodiments of the present invention. According to examples of the present invention, the apparatus 700 shown in FIG. 7 may be a User Equipment (UE). As shown in FIG. 7, the apparatus 700 comprises a transmitting unit 710 for transmitting information for indicating a type of CSI feedback information. The apparatus 700 may further comprise other components in addition to this unit, however, since these components are not related to the content of the embodiments of the present invention, the illustration and description thereof are omitted herein. Furthermore, since specific details of operations described below performed by the apparatus 700 according to the embodiments of the present invention are the same as those described above with reference to FIGS. 2-3 and FIGS. 5-6, repeated descriptions of the same details are omitted herein to avoid repetition.

In the embodiments according to the present invention, a type of the CSI feedback information may include two types, for example, a first type of (normal) CSI feedback information and a second type of (advanced) CSI feedback information, where the first type of CSI feedback information may be CSI feedback information for one beam in the multiple beams, and the second type of CSI feedback information may be CSI feedback information for the remaining beams in the multiple beams or CSI feedback information for all beams in the multiple beams. In particular, the first type of CSI feedback information may include a portion of the CSI feedback information for the multiple beams, and the second type of CSI feedback information may include the remaining information of the CSI feedback information for multiple beams other than the portion of the CSI feedback information for the multiple beams in the first type of CSI feedback information. Regarding the second type of CSI feedback information, alternatively, it may include not only the remaining information of the CSI feedback information for multiple beams other than the portion of the CSI feedback information for the multiple beams in the first type of CSI feedback information, but also the portion of the CSI feedback information for the multiple beams in the first type of CSI feedback information.

According to one example of the present invention, the information for indicating the type of the CSI feedback information may be a CSI type indicator (CTI). In particular, the CTI may include one or more bits, and different values of the bits represent different types of the CSI. For example, when the value of the bit is "1", it means that the corresponding CSI feedback information is transmitted by using a first type of CSI feedback manner, and when the value of the bit is "0", it means that the corresponding CSI feedback information is transmitted by using a second type of CSI feedback manner.

According to one example of the present invention, the transmitting unit 710 may independently transmit the information for indicating the type of the CSI feedback information. For example, the transmitting unit 710 may transmit the information for indicating the type of the CSI feedback information before transmitting the first type of CSI feedback information and the second type of CSI feedback information. Thus, before receiving the CSI feedback information for the multiple beams, the base station may acquire the type of the CSI feedback information to be received, so that corresponding processing may be accurately performed after receiving the CSI feedback information, thereby improving efficiency of processing the received CSI feedback information.

However, the present invention is not limited thereto. According to another example of the present invention, the transmitting unit 710 may include and transmit the information for indicating the type of the CSI feedback information in the first type of CSI feedback information in the CSI feedback information for the multiple beams. In this case, the information for indicating the type of the CSI feedback information and the first type of CSI feedback information may be simultaneously transmitted. Thus, the base station receives the information indicating the type of the CSI feedback information while receiving the first type of CSI feedback information, realizing one-time transmission of the type of the CSI feedback information and specific content of the CSI feedback information, thereby improving transmission efficiency Alternatively, according to another example of the present invention, the transmitting unit 710 may also include and transmit the information for indicating the type of the CSI feedback information in the second type of CSI feedback information in the CSI feedback information for the multiple beams. In this case, the information for indicating the type of the CSI feedback information and the second type of CSI feedback information may be simultaneously transmitted.

Then, the transmitting unit 710 is further used to transmit the first type of CSI feedback information in the CSI feedback information for the multiple beams by using the first type of CSI feedback manner, where the first type of CSI feedback information includes at least first transmission rank information, first channel quality information and feedback information for the first beam in the multiple beams.

In the embodiments according to the present invention, the multiple beams are L beams, and specifically may include one beam with the strongest power (leading beam) and (L−1) beams with relatively weak power (combined beams), where L≥2 and is a positive integer. The first beam in the multiple beams may be the beam with the strongest power in the multiple beams, or may be a beam with relatively weak power in the multiple beams.

In the embodiments according to the present invention, the first transmission rank information may be transmission rank information for a bandwidth occupied by the first beam in the multiple beams. In particular, the first transmission rank information may be transmission rank information for a bandwidth occupied by the beam with the strongest power in the multiple beams, or may be transmission rank information for a bandwidth occupied by a beam with relatively weak power in the multiple beams.

According to one example of the present invention, the first transmission rank information may be a transmission rank indicator (RI) for the first beam in the multiple beams, where the RI is a transmission rank recommended by the UE to be used by the base station in the downlink transmission, for example, a layer recommended to be used by the base station in the downlink transmission. The UE may report one RI within a valid bandwidth.

In the embodiments according to the present invention, the first channel quality information may be channel quality information for the first beam in the multiple beams. In particular, the first channel quality information may be channel quality information for the beam with the strongest power in the multiple beams, or may be channel quality information for a beam with relatively weak power in the multiple beams.

According to another example of the present invention, the first channel quality information may be a channel quality indicator (CQI) for the first beam in the multiple beams, where the CQI is channel quality information acquired at the UE side reported to the base station by the UE.

According to another example of the present invention, the feedback information for the first beam may include a Precoding Matrix Indicator (PMI) for the first beam, where the PMI indicates a precoding matrix recommended by the UE to be used by the base station in the downlink transmission, and the precoding matrix is selected based on a layer indicated by the RI. For example, the selection of the precoding matrix may be frequency selective, and the UE may recommend different precoding matrices for different portions of the downlink bandwidth. Therefore, the UE may report one or more PMIs at the same time.

For another example, the precoding matrix may include a first matrix (represented by $W_1$) and a second matrix (represented by $W_2$). Generally, $W_1$ may be a matrix of N*L, where N is the number of ports and is a positive integer, and L is the number of beams in the multiple beams and is a positive integer. Generally, $W_2$ may be an identity matrix. Therefore, the feedback information for the first beam may include a horizontal index of $W_1$ for the first beam, a vertical index of $W_1$ for the first beam, and matrix information of $W_2$ for the first beam.

According to another example of the present invention, the feedback information for the first beam may further include power information for the first beam. For example, the power information for the first beam may be a Relative Power Indicator (RPI). Alternatively, the first beam is the beam with the strongest power in the multiple beams, and therefore, the RPI of the first beam may be defaulted to a maximum value of 1 without being reported to the base station, thereby saving signaling overhead.

In addition, as already mentioned above, in one example of the present invention, the transmitting unit 710 may include and transmit the information for indicating the type of the CSI feedback information in the first type of CSI feedback information in the CSI feedback information for the multiple beams. For example, the information for indicating the type of the CSI feedback information may be transmitted together with the RI, the CQI or the PMI in the first type of CSI feedback information, respectively, or may be transmitted together with any combination of the RI, the CQI and the PMI in the first type of CSI feedback information, respectively, which is not limited herein.

Then, the transmitting unit 710 is further used to transmit the second type of CSI feedback information in the CSI feedback information for the multiple beams by using the second type of CSI feedback manner, where the second type of CSI feedback information includes at least second transmission rank information, second channel quality information and feedback information for the beams other than the first beam in the multiple beams.

As already mentioned above, in the embodiments according to the present invention, the multiple beams may include one beam with the strongest power and (L−1) beams with relatively weak power. When the first beam in the multiple beams is the beam with the strongest power in the multiple beams, the beams other than the first beam in the multiple beams may be the (L−1) beams with relatively weak power in the multiple beams; when the first beam in the multiple beams is a beam with relatively weak power in the multiple beams, the beams other than the first beam in the multiple beams may be the beam with the strongest power and the remaining (L−2) beams with relatively weak power in the multiple beams.

In the embodiments according to the present invention, the second transmission rank information may be transmission rank information for a bandwidth occupied by the second beam in the multiple beams. In particular, when the beams other than the first beam in the multiple beams are the (L−1) beams with relatively weak power in the multiple beams, the second transmission rank information may be transmission rank information for a bandwidth occupied by the (L−1) beams with relatively weak power in the multiple beams; when the beams other than the first beam in the multiple beams are the beam with the strongest power and the remaining (L−2) beams with relatively weak power in the multiple beams, the second transmission rank information may be transmission rank information for a bandwidth occupied by the beam with the strongest power and the remaining (L−2) beams with relatively weak power in the multiple beams.

According to one example of the present invention, the second transmission rank information may be the RI for the beams other than the first beams in the multiple beams, where the RI has been introduced above and will not be repeatedly described herein.

In the embodiments according to the present invention, the second channel quality information may be channel quality information for the beams other than the first beams in the multiple beams. In particular, when the beams other than the first beam in the multiple beams are the (L−1) beams with relatively weak power in the multiple beams, the second channel quality information may be channel quality information for the (L−1) beams with relatively weak power in the multiple beams; when the beams other than the first beam in the multiple beams are the beam with the strongest power and the remaining (L−2) beams with relatively weak power in the multiple beams, the second channel quality information may be channel quality information for the beam with the strongest power and the remaining (L−2) beams with relatively weak power in the multiple beams.

According to another example of the present invention, the second channel quality information may be the CQI for the beams other than the first beam in the multiple beams, where the CQI has been introduced above and will not be repeatedly described herein.

According to another example of the present invention, the feedback information for the beams other than the first beam in the multiple beams may be the PMI for the beams other than the first beam. For example, the feedback information for the beams other than the first beam in the multiple beams may include a horizontal index of $W_1$, a vertical index of $W_1$, and matrix information of $W_2$ for each of the beams other than the first beam in the multiple beams.

According to another example of the present invention, the feedback information for the beams other than the first beam in the multiple beams may further include power information of each of the beams other than the first beam in the multiple beams, wherein the power information of each of the beams other than the first beam in the multiple beams may also be the RPI. The RPI has been introduced above and will not be repeatedly described herein.

According to another example of the present invention, the transmission apparatus further comprises a processing unit 720, as shown in FIG. 7. The processing unit 720 may be used to obtain the second channel quality information according to the channel quality of the first beam and the channel quality of the beams other than the first beam. Correspondingly, when transmitting the second type of CSI feedback information, the processing unit 710 may transmit the second transmission rank information, the second channel quality information, and the feedback information for the beams other than the first beam in the second type of CSI feedback information as a whole.

In this example, the second channel quality information is obtained according to the channel quality of all beams in the multiple beams. That is, in this example, the second channel quality information is one piece of channel quality information.

Alternatively, the processing unit 720 may be used to divide the second type of CSI feedback information into a plurality of portions, and separately transmit the respective portions to further reduce signaling overhead required when the CSI feedback is performed each time. In particular, the processing unit 720 may divide the second type of CSI feedback information into a plurality of portions, where each portion may include feedback information for one or more beams and channel quality information corresponding to the portion. The second transmission rank information may be included in one of the plurality of portions. Furthermore, the second channel quality information is channel quality information for the plurality of portions.

The processing unit 720 divides the second type of CSI feedback information into a plurality of portions, where each portion may include feedback information for one or more beams and channel quality information corresponding to the portion. The second transmission rank information may be included in one of the plurality of portions. Furthermore, the second channel quality information is channel quality information for the plurality of portions.

As mentioned above, it is assumed that the number of beams in the multiple beams is L, the first type of CSI feedback information includes feedback information for the first beam, and the second type of CSI feedback information includes the remaining (L−1) beams, where L≥2 and is a positive integer. The processing unit 720 may divide the second type of CSI feedback information into a plurality of portions by, but not limited to, the following manner.

For example, the processing unit 720 may divide the second type of CSI feedback information into (L−1) portions in step S1031. Channel quality information corresponding to each portion may be obtained according to channel quality of one beam in each portion. Each portion of the (L−1)-portion CSI feedback information may include feedback information for one beam, and the second channel quality information is specifically expressed as a collection of channel quality information for each portion of the (L−1) portions. That is, feedback information for the 2nd beam, . . . , feedback information for the ith beam, . . . , feedback information for the Lth beam are respectively transmitted, and in the process of respectively transmitting, the ith beam has corresponding channel quality information. Therefore, in this example, the second channel quality information is specifically expressed as a collection of the channel quality information for the 2nd beam, . . . , the channel quality information for the ith beam, . . . , and the channel quality information for the Lth beam. Furthermore, the second transmission rank information may be included in only one portion of the (L−1)-portion CSI feedback information, preferably, in a portion of the (L−1)-portion CSI feedback information that is firstly transmitted to the base station.

As already mentioned above, the feedback information for the beams other than the first beam in the multiple beams may also include the RPI of each beam of the beams other than the first beam in the multiple beams. When the CQI corresponding to each portion is obtained according to channel quality of one beam in each portion, the RPI of each beam has been considered in the process of calculating the CQI for each portion, that is, the RPI of each beam is implicitly embodied in the CQI for each beam. Therefore, in this case, the RPI of each beam may no longer be calculated and transmitted.

As already mentioned above, the second type of CSI feedback information is divided into (L−1) portions in the processing unit 720, and channel quality information corresponding to each portion may be obtained according to channel quality of one beam in each portion. However, the present invention is not limited thereto. Alternatively, the second type of CSI feedback information is divided into (L−1) portions in the processing unit 720, and the channel quality information corresponding to each portion may also be obtained according to the channel quality of the first beam and channel quality of one beam in each portion. In this case, the RPI of each beam may be calculated and transmitted. In particular, when calculating the CQI corresponding to each portion, not only the channel quality of one beam in each portion but also the channel quality of the first beam may be considered. The channel quality of the first beam is additionally considered in the process of calculating the CQI for each portion, thus, the CQI for each portion may not accurately embody the RPI of each beam. Therefore, in this case, the RPI of each beam may be calculated and transmitted.

Furthermore, as already mentioned above, the second type of CSI feedback information is divided into (L−1) portions in the processing unit 720, and each portion may include feedback information for one beam. However, the present invention is not limited thereto. Alternatively, the second type of CSI feedback information may also be divided into a plurality of portions in the processing unit 720, and each portion may include feedback information for at least one beam. For example, the second type of CSI feedback information may be divided into P portions, where $1 \leq P < (L-1)$ and P is a positive integer. Each portion of the P portions includes feedback information for at least one beam, and channel quality information corresponding to each portion may be obtained according to channel quality of the at least one beam in each portion. In this case, the RPI of each beam may no longer be calculated and transmitted. In particular, when the CQI corresponding to each portion is obtained according to the channel quality of the at least one beam in each portion, the RPI of each beam has been considered in the process of calculating the CQI for each portion, that is, the RPI of each beam is implicitly embodied in the CQI for each portion. Therefore, in this case, the RPI of each beam may no longer be calculated and transmitted.

However, the present invention is not limited thereto. Alternatively, the second type of CSI feedback information is divided into P portions in the processing unit 720, and channel quality information corresponding to each portion may also be obtained according to the channel quality of the first beam and channel quality of at least one beam in each portion. In this case, the RPI of each beam may be calculated and transmitted. In particular, when calculating the CQI corresponding to each portion, not only the channel quality of the at least one beam in each portion but also the channel quality of the first beam is considered. The channel quality of the first beam is additionally considered in the process of calculating the CQI for each portion, thus, the CQI for each portion may not accurately embody the RPI of each beam in each portion. In this case, the RPI of each beam in each portion needs to be calculated and transmitted.

Then, the transmitting unit 710 transmits the divided plurality of portions, respectively.

Bit error rate is reduced by the processing unit 720 dividing the second type of CSI feedback information into a plurality of portions to transmit.

Furthermore, according to another example of the present invention, the transmitting unit 710 may transmit the first type of CSI feedback information and/or the second type of CSI feedback information described above on a Physical Uplink Shared Channel (PUSCH) and a Physical Uplink Control Channel (PUCCH), respectively. For example, the transmitting unit 710 may transmit both of the first type of CSI feedback information and the second type of CSI feedback information on the PUSCH; or transmit the first type of CSI feedback information on the PUSCH and transmit the second type of CSI feedback information on the PUCCH; or transmit the first type of CSI feedback information on the PUCCH and transmit the second type of CSI feedback information on the PUSCH; or transmit the first type of CSI feedback information and the second type of CSI feedback information on the PUCCH. Preferably, the transmitting unit 710 may transmit the first type of CSI feedback information on the PUCCH or the PUSCH, and transmit the second type of CSI feedback information on the PUSCH. With this optional implementation, the second type of CSI feedback information with a relatively large amount of data is transmitted on the PUSCH, thereby occupying less radio resources for the PUCCH and saving overhead for the PUCCH.

In addition, as already mentioned above, in another optional implementation of this embodiment, the transmitting unit 710 may include and transmit the information for indicating the type of the CSI feedback information in the second type of CSI feedback information in the CSI feedback information for the multiple beams. For example, the information for indicating the type of the CSI feedback information may be transmitted together with the RI, the PMI or the CQI in the second type of CSI feedback information, respectively, or may be transmitted together with any combination of the RI, the PMI and the CQI in the second type of CSI feedback information, respectively, which is not limited herein.

According to another example of the present invention, the transmitting unit 710 is further used to transmit information indicating the number of beams in the second type of CSI feedback information. According to one example of the present invention, the information for indicating the number of beams in the second type of CSI feedback information may be a Beam Number Indicator (BNI). For example, the BNI may be included in the first type of CSI feedback information and transmitted, for example, may be transmitted together with the RI, the PMI or the CQI in the first type of CSI feedback information, respectively, or may be transmitted together with any combination of the RI, the PMI and the CQI in the first type of CSI feedback information, respectively. For another example, the BNI may also be included in the second type of CSI feedback information and transmitted, for example, may be transmitted together with the RI, the PMI or the CQI in the second type of CSI feedback information, respectively, or may be transmitted together with any combination of the RI, the PMI and the CQI in the second type of CSI feedback information, respectively. Preferably, the BNI may be transmitted together with the RI in the second type of CSI feedback information.

In the case of dividing the second type of CSI feedback information into a plurality of portions, the information for indicating the number of beams (for example, BNI) in the second type of CSI feedback information may be included in the second type of CSI feedback information and transmitted. In this example, the information for indicating the number of beams in the second type of CSI feedback information is included in only one portion of the plurality of portions and transmitted. Preferably, the information for indicating the number of beams in the second type of CSI feedback information is included in a first portion of the plurality of portions and transmitted, so that after receiving the first portion, the base station dynamically adjusts radio resources occupied by the remaining portions according to the information, thereby saving overhead.

In the transmission apparatus for the CSI feedback information for the multiple beams according to the embodiments of the present invention, the CSI feedback information for the multiple beams is transmitted by different types of CSI feedback manners (for example, the first type of CSI feedback manner and the second type of CSI feedback manner), and the corresponding CSI feedback information in the CSI feedback information for the multiple beams is transmitted for different types of CSI feedback manners, thereby allocating radio resources reasonably and saving overhead effectively while ensuring complete transmission of the CSI feedback information for the multiple beams.

Furthermore, according to another example of the present invention, the second type of CSI feedback information may include partial of the first type of CSI feedback information. Therefore, even if the first type of CSI feedback manner is not used for the transmission of the first type of feedback information, the complete transmission of the CSI feedback information for the multiple beams may also be ensured only by the transmission of the second type of CSI feedback information.

In addition, block diagrams used in the description of the above embodiments show blocks in units. These structural units may be realized by any combination of hardware and/or software. In addition, means for realizing respective structural units is not particularly limited. That is, respective structural units may be realized by one apparatus that is physically and/or logically aggregated, or may be realized by directly and/or indirectly (for example, wired and/or wireless) connecting two or more physically and/or logically separate apparatuses and using the plurality of apparatuses.

Figure 8:
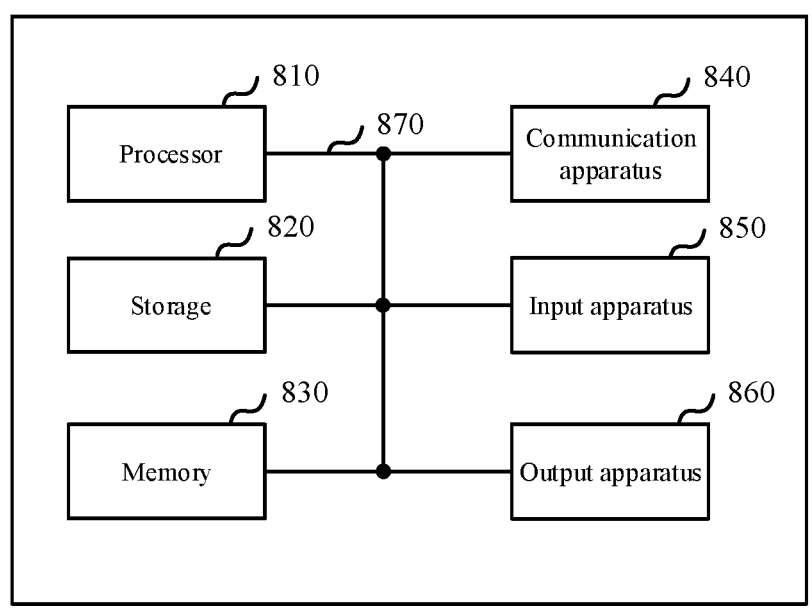
FIG. 8 shows a schematic diagram of a hardware structure of a user equipment involved according to one embodiment of the present invention.

For example, the user equipment in the embodiments of the present invention may function as a computer that executes the processing of the transmission method for the CSI feedback information for the multiple beams of the present invention. FIG. 8 shows a schematic diagram of a hardware structure of a user equipment involved according to the embodiments of the present invention. The user equipment 800 described above may be constructed as a computer apparatus that physically includes a processor 810, a storage 820, a memory 830, a communication apparatus 840, an input apparatus 850, an output apparatus 860, and a bus 870 and the like.

In addition, in the following description, words such as "apparatus" may be replaced by "circuit", "device", "unit" and so on. The hardware structure of the user equipment 800 may include one or more of respective apparatuses shown in the drawings, or may not include part of the apparatuses.

For example, although only one processor 810 is shown, a plurality of processors may be provided. Furthermore, the processing may be executed by one processor, or may be executed either simultaneously or in sequence, or using other methods by two or more processors. In addition, the processor 810 may be installed by one or more chips.

Each function of the user equipment 800 is realized, for example, by the following ways: by reading predetermined software (program) into hardware such as the processor 810 and the storage 820 so as to cause the processor 810 to perform calculations; by controlling communication carried out by the communication apparatus 840; and by controlling the reading and/or writing of data in the storage 820 and the memory 830.

The processor 810 may control the whole computer by, for example, running an operating system. The processor 810 may be constituted by a Central Processing Unit (CPU) including interfaces with peripheral apparatuses, control apparatuses, computing apparatuses, registers and so on. For example, the baseband signal processing unit, the call processing unit, and the like described above may be implemented by the processor 810.

Furthermore, the processor 810 reads programs (program codes), software modules or data from the memory 830 and/or the communication apparatus 840 into the storage 820, and executes various processing according to them. As for the programs, programs causing computers to execute at least part of the operations described in the above embodiments may be used. For example, the control unit of the user equipment 800 may be implemented by a control program stored in the storage 820 and operated by the processor 810, and other functional blocks may be implemented in the same way.

The storage 820 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The storage 820 may also be referred to as a "register", a "cache", a "main memory" (primary storage apparatus) and so on. The storage 820 may store executable programs (program codes), software modules and so on for implementing the radio communication methods involved in the embodiments of the present invention.

The memory 830 is a computer-readable recording medium, and may be constituted by, for example, at least one of a flexible disk, a floppy (registered trademark) disk, a magneto-optical disk (for example, a compact disc (Compact Disc ROM (CD-ROM) etc.), a digital versatile disc, a Blu-ray (registered trademark) disk), a removable disk, a hard disk drive, a smart card, a flash memory device (for example, a card, a stick, a key driver, etc.), a magnetic stripe, a database, a server, and/or other appropriate storage media. The memory 830 may be referred to as "secondary storage apparatus."

The communication apparatus 840 is hardware (transmitting/receiving device) for allowing inter-computer communication by using wired and/or wireless networks, and may be referred to as, for example, a "network device", a "network controller", a "network card", a "communication module" and so on. The communication apparatus 840 may include, a high frequency switch, a duplexer, a filter, a frequency synthesizer, and the like in order to implement, for example, Frequency Division Duplex (FDD) and/or Time Division Duplex (TDD). For example, the above-described transmitting and receiving antenna, amplifying unit, transmitting and receiving unit, transmission path interface, and the like may be implemented by the communication apparatus 840.

The input apparatus 850 is an input device for receiving input from the outside (for example, a keyboard, a mouse, a microphone, a switch, a button, a sensor and so on). The output apparatus 860 is an output device for allowing output to the outside (for example, a display, a speaker, a Light Emitting Diode (LED) lamp and so on). In addition, the input apparatus 850 and the output apparatus 860 may be provided in an integrated structure (for example, a touch panel).

Furthermore, respective apparatuses such as the processor 810, the storage 820 and so on are connected by the bus 870 for communicating information. The bus 870 may be constituted by a single bus, or different buses between the apparatuses.

Also, the user equipment 800 may be structured to include hardware such as a microprocessor, a digital signal processor (DSP), an Application-Specific Integrated Circuit (ASIC), a Programmable Logic Device (PLD), a Field Programmable Gate Array (FPGA) and so on, and part or all of the functional blocks may be implemented by the hardware. For example, the processor 810 may be installed with at least one of these hardware.

Terms illustrated in the present specification and/or terms required for the understanding of the present specification may be substituted with terms having the same or similar meaning. For example, a channel and/or a symbol may also be a signal. In addition, the signal may also be a message. A reference signal may be abbreviated as an "RS", and may be referred to as a "pilot", a "pilot signal" and so on, depending on the standard applied. In addition, a component carrier (CC) may be referred to as a cell, a frequency carrier, a carrier frequency, or the like.

In addition, the radio frame may be composed of one or more periods (frames) in the time domain. Each of the one or more periods (frames) constituting the radio frame may also be referred to as a subframe. Further, a subframe may be composed of one or more slots in the time domain. The subframe may be a fixed length of time duration (e.g., 1 ms) that is independent of the numerology.

Furthermore, a slot may be composed of one or more symbols (Orthogonal Frequency Division Multiplexing (OFDM) symbols, Single Carrier Frequency Division Multiple Access (SC-FDMA) symbols, and so on) in the time domain. Furthermore, the slot may also be a time unit based on the numerology. Furthermore, a slot may also include a plurality of microslots. Each microslot may be composed of one or more symbols in the time domain. Furthermore, a microslot may also be referred to as a "subslot".

A radio frame, a subframe, a slot, a microslot and a symbol all represent the time unit during signal transmission. A radio frame, a subframe, a slot, a microslot and a symbol may also use other names that correspond to each other. For example, one subframe may be referred to as a transmission time interval (TTI), a plurality of consecutive subframes may also be referred to as a "TTI", and one slot or one microslot may also be referred to as a "TTI." That is, a subframe and/or a TTI may be a subframe (1 ms) in existing LTE, may be a period less than 1 ms (for example, 1~13 symbols), or may be a period longer than 1 ms. In addition, a unit representing a TTI may also be referred to as a slot, a microslot, or the like instead of a subframe.

Herein, a TTI refers to, for example, the minimum time unit of scheduling in radio communication. For example, in LTE systems, a radio base station performs scheduling for allocating radio resources (such as frequency bandwidths and transmission power that may be used in respective user terminals) in unit of TTI for respective user terminals. It should be noted that the definition of the TTI is not limited thereto.

A TTI may be a channel-coded data packet (transport block), a code block, and/or a codeword transmission time unit, or may be a processing unit of scheduling, link adaptation and so on. In addition, when a TTI is given, the time interval (e.g., the number of symbols) actually mapped to the transport block, code block, and/or codeword may also be shorter than the TTI.

In addition, when one slot or one microslot is called a TTI, more than one TTI (i.e., more than one slot or more than one microslot) may also become the minimum time unit of the scheduling. Furthermore, the number of slots (the number of microslots) constituting the minimum time unit of the scheduling may be controlled.

A TTI having a time duration of 1 ms may be referred to as a "normal TTI" (TTI in LTE Rel. 8 to 12), a "standard TTI", a "long TTI", a "normal subframe", a "standard subframe", or a "long subframe", and so on. A TTI that is shorter than a normal TTI may be referred to as a "shortened TTI", a "short TTI", a "partial (or fractional) TTI", a "shortened subframe", a "short subframe", a "microslot", or a "subslot" and so on.

In addition, a long TTI (e.g., a normal TTI, a subframe, etc.) may be replaced with a TTI having a time duration exceeding 1 ms, and a short TTI (e.g., a shortened TTI, etc.) may also be replaced with a TTI having a TTI duration shorter than the TTI duration of the long TTI and exceeding 1 ms.

A resource block (RB) is a resource allocation unit in the time domain and the frequency domain, and may include one or a plurality of consecutive subcarriers in the frequency domain. Also, an RB may include one or more symbols in the time domain, and may be one slot, one microslot, one subframe or one TTI duration. One TTI and one subframe each may be composed of one or more resource blocks, respectively. In addition, one or more RBs may also be referred to as a "Physical Resource Block (PRB)", a "Sub-Carrier Group (SCG)", a "Resource Element Group (REG)", a "PRG pair", an "RB pair" and so on.

Also, a resource block may also be composed of one or more resource elements (RE). For example, one RE can be a radio resource area of a subcarrier and a symbol.

In addition, the above-described structures of radio frames, subframes, slots, microslots and symbols and so on are merely examples. For example, configurations such as the number of subframes included in a radio frame, the number of slots of each subframe or radio frame, the number or microslots included in a slot, the number of symbols and RBs included in a slot or microslot, the number of subcarriers included in an RB, the number of symbols in a TTI, the symbol duration and the cyclic prefix (CP) duration may be variously changed.

Furthermore, information and parameters and so on described in the present specification may be represented in absolute values or in relative values with respect to prescribed values, or may be represented in corresponding other information. For example, radio resources may be indicated by prescribed indices. Further, equations or the like using these parameters may be different from those explicitly disclosed in the present specification.

Names used for parameters or the like in the present specification are not limitative in any respect. For example, since various channels (PUCCHs, PDCCHs, etc.) and information elements may be identified by any suitable names, the various names assigned to these various channels and information elements are not limitative in any respect.

Information, signals and so on described in the present specification may be represented by using any one of various different technologies. For example, data, commands, instructions, information, signals, bits, symbols and chips, all of which may be referenced throughout the specification, may be represented by voltages, currents, electromagnetic waves, magnetic fields or particles, optical fields or photons, or any combination thereof.

Furthermore, information, signals and so on may be output from higher layers to lower layers and/or from lower layers to higher layers. Information, signals and so on may be input and/or output via a plurality of network nodes.

The information, signals and so on that are input and/or output may be stored in a specific location (for example, in a storage), or may be managed by using a control table. The information, signals and so on that are input and/or output may be overwritten, updated or appended. The information, signals and so on that are output may be deleted. The information, signals and so on that are input may be transmitted to other apparatuses.

Notification of information is by no means limited to the aspects/implements described in the present specification, and other methods may be used as well. For example, notification of information may be implemented by using physical layer signaling (for example, downlink control information (DCI), uplink control information (UCI)), higher layer signaling (for example, Radio Resource Control (RRC) signaling, broadcast information (Master Information Blocks (MIBs), System Information Blocks (SIBs), etc.), Medium Access Control (MAC) signaling and so on), other signals and/or combinations thereof.

In addition, physical layer signaling may also be referred to as L1/L2 (Layer 1/Layer 2) control information (L1/L2 control signals), L1 control information (L1 control signals) and so on. Also, RRC signaling may be referred to as an "RRC message", and may be, for example, an RRC connection setup message, an RRC connection reconfiguration message, and so on. Also, MAC signaling may be notified using, for example, an MAC control element (MAC CE).

Furthermore, notification of prescribed information (for example, notification of "X") is not limited to be performed explicitly, but may be performed implicitly (for example, by not performing the notification of the prescribed information or by performing notification of other information).

Regarding the determination, it may be performed by a value (0 or 1) represented by 1 bit, or by a true or false value (Boolean value) represented by true or false, and may also be performed by comparison of numerical values (for example, comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

Furthermore, software, commands, information and so on may be transmitted and received via communication media. For example, when software is transmitted from a website, a server or other remote sources by using wired technologies (coaxial cables, optical fiber cables, twisted-pair cables, digital subscriber lines (DSL), etc.) and/or wireless technologies (infrared radiation, microwaves, etc.), these wired technologies and/or wireless technologies are included in the definition of communication media.

Terms such as "system" and "network" in the present specification may be used interchangeably.

In the present specification, terms such as "base station (BS)", "radio base station", "eNB", "gNB", "cell", "sector", "cell group", "carrier", and "component carrier" may be used interchangeably. The base station is sometimes also referred to as a fixed station, a NodeB, an eNodeB (eNB), an access point, a transmission point, a reception point, a femto cell, a small cell, and the like.

The base station is capable of accommodating one or more (for example, three) cells (also referred to as sectors). In a case where the base station accommodates a plurality of cells, an entire coverage area of the base station is capable of being divided into a plurality of smaller areas, and each smaller area is capable of providing communication services using a base station sub-system (for example, a small base station for indoor use (a remote radio head, RRH)). The terms "cell" and "sector" refer to a part of or an entirety of a coverage area of the base station and/or a sub-system of the base station providing communication services.

In the present specification, terms such as "Mobile Station (MS)", "user terminal", "User Equipment (UE)" and "terminal" may be used interchangeably. A mobile station is sometimes referred to by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other suitable terms.

In addition, the wireless base station in the present specification may also be replaced with a user terminal. For example, the respective aspects/embodiments of the present invention may be applied to a configuration in which communication between a radio base station and a user terminal is replaced with communication among a plurality of user terminals (device-to-device, D2D). At this time, the function of the above-described wireless base station may be regarded as a function of the user terminal. In addition, words such as "upstream" and "downstream" may also be replaced with "side". For example, the uplink channel may also be replaced with a side channel.

Similarly, the user terminal in the present specification may also be replaced with a wireless base station. At this time, the function of the above-described user terminal may be regarded as a function of the wireless base station.

In the present specification, a specific operation configured to be performed by a base station may sometimes be performed by an upper node, depending on the circumstances. Obviously, in a network composed of one or more network nodes having a base station, various actions for communication with terminals may be performed by the base station, more than one network nodes other than the base station (such as, but not limited to, a Mobility Management Entity (MME), a Serving-Gateway (S-GW), etc. may be considered), or a combination thereof.

The respective aspects/embodiments described in the present specification may be used individually or in combinations, and may also be switched and used during the process of execution. The order of processing steps, sequences, flow charts and so on of the respective aspects/embodiments described in the present specification may be re-ordered as long as inconsistencies do not arise. For example, although various step units have been illustrated in exemplary orders with regard to the methods described in the present specification, the specific orders illustrated herein is by no means limitative.

The aspects/embodiments illustrated in the present specification may be applied to systems that use Long Term Evolution (LTE), LTE-Advanced (LTE-A), LTE-Beyond (LTE-B), super 3rd generation mobile communication system (SUPER 3G), International Mobile Telecommunications-Advanced (IMT-Advanced), 4th generation mobile communication system (4G), 5th generation mobile communication system (5G), Future Radio Access (FRA), new Radio Access Technology (New-RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), other suitable radio communication methods and/or next-generation systems that are extended based on them.

The phrase "based on" as used in the present specification does not mean "based only on", unless otherwise specified. In other words, the phrase "based on" means both "based only on" and "based at least on."

Any reference to units using terms like "first" and "second" used in the present specification does not fully restrict quantity or order of these units. These terms may be used in the present specification as a convenient method to distinguish between two or more units. Therefore, references to first and second units do not mean that only two units can be used, or that the first unit should be prior to the second unit in some way.

The terms such as "deciding" and "determining" used in the present specification sometimes comprise a wide variety of operations. The "deciding" and "determining" may include regarding, for example, calculating, computing, processing, deriving, investigating, looking up (e.g., looking up in a table, a database or other data structures) and ascertaining, as performing the "deciding" and "determining". In addition, the "deciding" and "determining" may include regarding receiving (e.g., receiving information), transmitting (for example, transmitting information), inputting, outputting and accessing (e.g., accessing data in the memory) as performing the "deciding" and "determining". In addition, the "deciding" and "determining" may include regarding resolving, selecting, choosing, establishing, comparing and the like as performing the "deciding" and "determining". That is to say, the "deciding" and "determining" may include regarding certain operations as the "deciding" and "determining".

As used herein, the terms "connected" and "coupled", or any variation of these terms, mean any direct or indirect connections or coupling between two or more units, and may include the presence of one or more intermediate units between two units that are "connected" or "coupled" to each other. The coupling or connection between the units may be physical, logical or a combination thereof. For example, "connection" may be replaced with "access." As used herein, two units may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical (both visible and invisible) regions.

When terms such as "include", "comprise" and variations thereof are used in the present specification or in the claims, these terms are intended to be inclusive, like the term "provide". Furthermore, the term "or" as used in the present specification or in the claims does not mean exclusive or.

Although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for illustrative purposes, and should by no means be construed to limit the present invention in any way.

What is claimed is:

1. A method performed by a terminal, the method comprising:
    transmitting information for indicating a type of channel state information feedback information;
    transmitting a first type of channel state information feedback information in the channel state information feedback information for multiple beams by using a first type of channel state information feedback manner, wherein the first type of channel state information feedback information includes at least first transmission rank information, first channel quality information and feedback information for a first beam in the multiple beams;
    transmitting a second type of channel state information feedback information in the channel state information feedback information for the multiple beams by using a second type of channel state information feedback manner, wherein the second type of channel state information feedback information includes at least second transmission rank information, second channel quality information and feedback information for beams other than the first beam in the multiple beams.

2. The method of claim 1, wherein the second type of channel state information feedback information further includes feedback information for the first beam.

3. The method of claim 1, wherein the transmitting information for indicating a type of the channel state information feedback information includes:
  transmitting the information for indicating the type of the channel state information feedback information independently; or
  transmitting the information for indicating the type of the channel state information feedback information by including it in the first type of channel state information feedback information; or
  transmitting the information for indicating the type of the channel state information feedback information by including it in the second type of channel state information feedback information.

4. The method of claim 1, further comprising:
  transmitting information for indicating the number of beams in the second type of channel state information feedback information.

5. The method of claim 4, wherein the transmitting the second type of channel state information feedback information includes:
  transmitting the second transmission rank information, the second channel quality information, and the feedback information for the beams other than the first beam as a whole.

6. The method of claim 5, further comprising:
  obtaining the second channel quality information according to channel quality of the first beam and channel quality of the beams other than the first beam.

7. The method of claim 4, wherein the transmitting the second type of channel state information feedback information includes:
  dividing the second type of channel state information feedback information into a plurality of portions, wherein each portion includes feedback information for one or more beams and channel quality information corresponding to said each portion, the second transmission rank information is included in one of the plurality of portions, and the second channel quality information is channel quality information for the plurality of portions;
  transmitting the plurality of portions respectively.

8. The method of claim 7, further comprising:
  obtaining the channel quality information corresponding to said each portion according to channel quality of one or more beams in said each portion; or
  obtaining the channel quality information corresponding to said each portion according to the channel quality of the first beam and channel quality of one or more beams in said each portion.

9. The method of claim 7, further comprising:
  transmitting the information for indicating the number of beams in the second type of channel state information feedback information by including it in one of the plurality of portions.

10. A terminal comprising:
  a processor; and
  a storage medium having computer program instructions stored thereon, wherein the computer program instructions, when executed by the processor, perform processing of:
  transmitting information for indicating a type of channel state information feedback information;
  transmitting a first type of channel state information feedback information in the channel state information feedback information for multiple beams by using a first type of channel state information feedback manner, wherein the first type of channel state information feedback information includes at least first transmission rank information, first channel quality information and feedback information for a first beam in the multiple beams;
  transmitting a second type of channel state information feedback information in the channel state information feedback information for the multiple beams by using a second type of channel state information feedback manner, wherein the second type of channel state information feedback information includes at least second transmission rank information, second channel quality information and feedback information for beams other than the first beam in the multiple beams.

11. The terminal of claim 10, wherein the second type of channel state information feedback information further includes feedback information for the first beam.

12. The terminal of claim 10, wherein,
  the processor is further configured to transmit the information for indicating the type of the channel state information feedback information independently;
  or transmit the information for indicating the type of the channel state information feedback information by including it in the first type of channel state information feedback information; or transmit the information for indicating the type of the channel state information feedback information by including it in the second type of channel state information feedback information.

13. The terminal of claim 10, wherein,
  the processor is further configured to transmit information for indicating the number of beams in the second type of channel state information feedback information.

14. The terminal of claim 13, wherein,
  the processor is further configured to transmit the second transmission rank information, the second channel quality information, and the feedback information for the beams other than the first beam as a whole.

15. The terminal of claim 14, wherein:
  the processor is configured to obtain the second channel quality information according to channel quality of the first beam and channel quality of the beams other than the first beam.

16. The terminal of claim 13, wherein,
  the processor is further configured to divide the second type of channel state information feedback information into a plurality of portions, wherein each portion includes feedback information for one or more beams and channel quality information corresponding to said each portion, the second transmission rank information is included in one of the plurality of portions, and the second channel quality information is channel quality information for the plurality of portions;
  the processor is further configured to transmit the plurality of portions respectively.

17. The terminal of claim 16, wherein,
  the processor is further configured to obtain the channel quality information corresponding to said each portion according to channel quality of one or more beams in said each portion; or obtain the channel quality information corresponding to said each portion according to the channel quality of the first beam and channel quality of one or more beams in said each portion.

18. The terminal of claim 16, wherein,
  the processor is further configured to transmit the information for indicating the number of beams in the second type of channel state information feedback information by including it in one of the plurality of portions.

19. The terminal of claim 10, wherein the feedback information for the beams other than the first beam includes power information for the beams other than the first beam.

20. The terminal of claim 10, wherein,
the processor is further configured to transmit the first type of channel state information feedback information on a Physical Uplink Control Channel (PUCCH) or a Physical Uplink Shared Channel (PUSCH).

\* \* \* \* \*